May 10, 1960
R. I. MISNER
2,935,872
WEATHER GAUGE
Filed Sept. 8, 1958
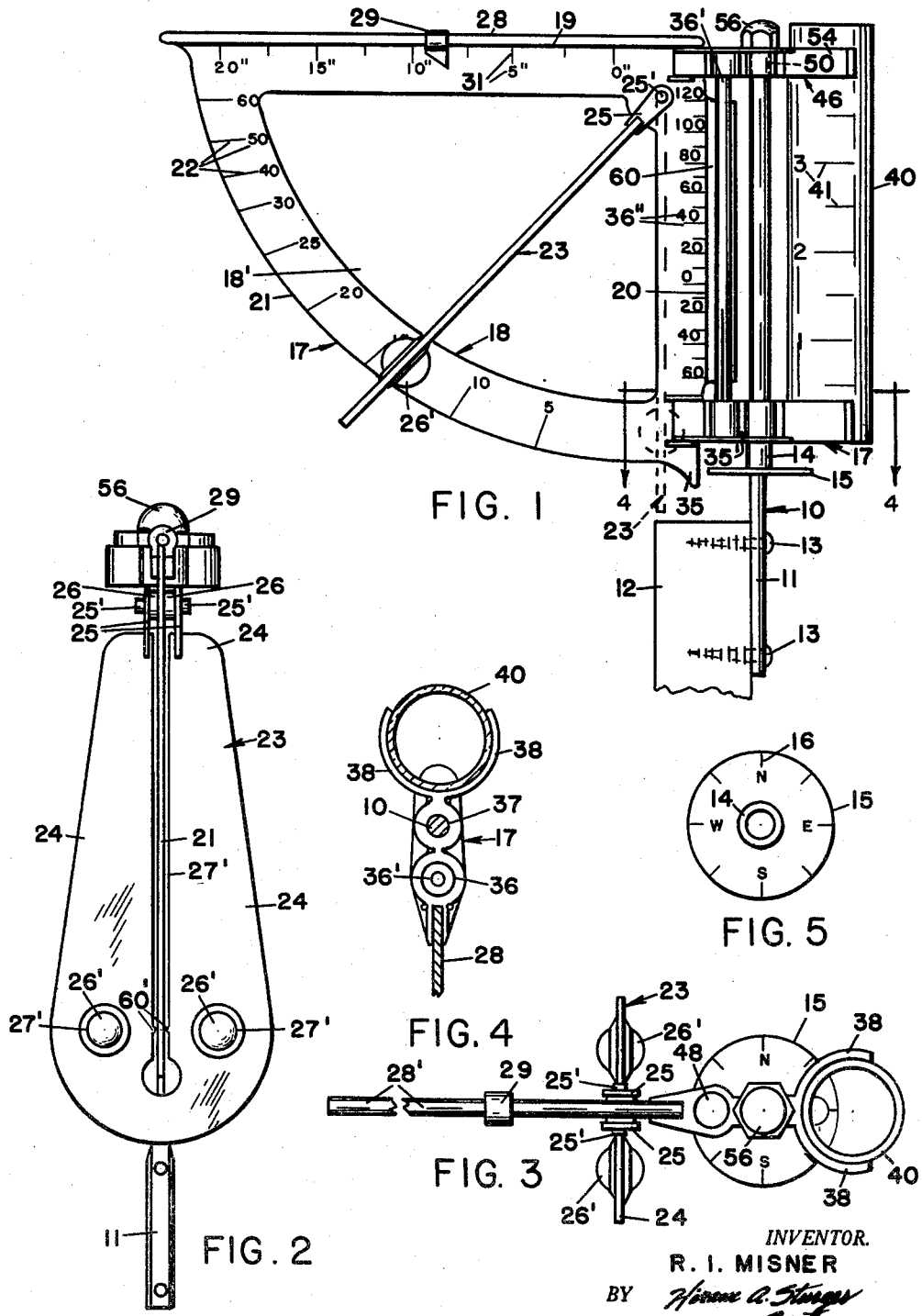
INVENTOR.
R. I. MISNER

United States Patent Office 2,935,872
Patented May 10, 1960

2,935,872

WEATHER GAUGE

Richard I. Misner, Omaha, Nebr.

Application September 8, 1958, Serial No. 759,575

6 Claims. (Cl. 73—189)

This invention relates to a weather gauge having a wind indicating portion of more efficient and compact construction.

A further object is to provide a vane which is adapted to move across the main body portion of the indicator with the minimum of friction.

Still another object is to provide an indicator with a vane having forwardly extending leg portions which are of substantial horizontal width for catching considerable wind whereby the remainder of the vane can be smaller so as to give the device compact shape for better functioning and easier shifting.

Still another object is to provide an indicator as described, the inner ends of the vane of which have vertical surfaces in engagement with vertical bearing surfaces for guiding the vane in its swinging movements.

An important object is to provide a wind indicator the vane portion of which is provided with legs mounted adjacent the forward side of the body portion whereby the major part of the vane overlaps the body portion for compact shape, better functioning and easier shipping.

Still another object is to provide a vane which is weighted at its outer end whereby the remainder of the vane can be made of light material for economy of construction, and in which the weights are preferably secured to the material by the extending of the material itself about the imbedded weights.

A further object is to provide a weather gauge having in combination a wind indicator mounted for rotation about a vertical post and a rain-fall collecting and measuring tube disposed in the opposite side of the post from the wind indicator so as to counterbalance the wind indicator to facilitate its free rotation and whereby the wind indicator also cooperatively counterbalances the rain-fall indicator.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Figure 1 is an elevational view of the weather gauge, constructed according to the present invention;

Figure 2 is a view taken at right angles to the view shown in Figure 1;

Figure 3 is a top plan view of the weather gauge;

Figure 4 is a sectional view taken on the line 4—4 of Figure 1; and

Figure 5 is a top plan view taken on the line 5—5 of Figure 1.

Referring in detail to the drawings, the numeral 10 indicates the weather gauge of the present invention and the weather gauge 10 is shown to comprise a vertically disposed rod 11 which has its flattened lower end secured to a supporting structure 12 by suitable securing elements 13. The numeral 14 indicates a stationary tube which rests on the top of the flattened lower end of the rod 11 and can be glued in place although glue is unnecessary, and the tube 14 is provided with a lower horizontally disposed lip 15 that has wind direction indicia 16 thereon, as best seen in Figure 5.

The weather gauge of the present invention further includes a body member which is indicated generally by the numeral 17, and the body member 17 is rotatably connected to the rod 11 just above the tube 14. The body member 17 includes a quadrant shaped portion 18 which is substantially flat on its sides and formed of relatively thin material, the flat sides thereof being vertically disposed. The quadrant shaped portion 18 being shaped to include a horizontally disposed upper edge 19, a vertically disposed edge 20, and an arcuate outer edge 21. The quadrant shaped portion 18 is preferably solid being filled in its center portion 18' with a material which is preferably integral with the edge portions of the quadrant portion 18 whereby the quadrant shaped portion 18 and its center 18' together have side surfaces which can be called wind-receiving surfaces which are of substantial size and which are in substantial parallelism and are spaced apart a short distance with respect to each other relative to the distances of the other dimensions of said surfaces for achieving a thinness so as to cause said wind indicator to function as a wind-vane for assuming a position in approximate parallelism with the direction of wind striking said wind surfaces. The numeral 22 indicates scale markings or indicia including numerals indicating wind miles per hour which are arranged adjacent the edge 21, for a purpose to be later described.

There is further provided a movable vane which is indicated generally by the numeral 23, and the vane 23 is of a substantial U-shape, Figure 2. The vane 23 is shown to comprise a pair of spaced apart legs 24 having terminal portions 25 which have inner surfaces arranged in spaced vertical planes. The terminal portions 25 are pivotally connected to the upper portion of the body member 17 by means of a horizontal pivot pin 25' therethrough on which the terminal portions 25 are free to rotate, bearing against raised bearing portions 26 which extend outwardly from, and are preferably integral with, the upper forward corner of the quadrant shaped portion 18. The outer surfaces of the bearing portions 26 are disposed in vertical planes.

Ball shaped weights 26' are carried by the vane 23 and are molded into the vane 23 with circular flanges 27 integral with the vane 23 extending over sufficient portions of the surfaces of said weights above and below the plane of said vane 23 respectively for retaining the weights firmly in openings 27' between the flanges. The openings 27' are circular in top plan view and have inner walls which are the shape of a part of a sphere complemental to the outer surface of the balls 26. The numeral 28 indicates a space or slot defined between the legs 24 of a width greater than the thickness of the arcuate outer edge 21 of the quadrant portion 18 so as to receive the quadrant portion 21 preferably without any engagement of the U-shaped vane 23 with the arcuate outer edge section 21.

The side portions of the movable vane 23 are of a sufficient width so that the vane portion 23 is deflected upwardly against the resistance of its weight and the weight of the ball-shaped weights 26' so that the movable vane 23 is adapted to coact with the indicia 22 to indicate wind speed.

It is understood that it is desirable to make the wind indicator vane 23 out of a light plastic material and it is for this reason that I have found it desirable to add the ball weights 26, the latter having a size suitable for causing the accurate indiction of wind along the indicia 22.

Arranged along the upper edge of the body member 17 is a horizontally disposed bead or elongated shoulder 28, and the numeral 29 indicates a movable marker which is adjustably mounted on the bead 28. It is desirable that the marker have a slot extending horizontally therethrough which latter has an upper portion adapted to slidably receive the bead 28 and a lower portion receiving that upper portion of the quadrant portion 18 which is disposed beneath the upper edge 19. It is desirable that the marker 29 grip the bead 28 sufficiently tightly that while the marker can be manually moved along the bead, it will retain itself on the bead in an adjusted position between the manual movements.

The marker 29 is adapted to coact with indicia or scale markings 31 indicating inches of rain fall, the scale markings being arranged along the upper horizontal edge portion of the body member 17 so that the marker 29 can be used for providing a record of accumulated rain fall.

The body member 17 is provided with a downwardly extending indicating projection 35 having vertical forward edge which is disposed adjacent and extends downwardly somewhat below the lip 15 whereby the indicating projection 35 is adapted to cooperate with the indicia 16 on the lip 15 for indicating wind direction.

Above the indicating projection 35 is a generally horizontally extending section 35' which is attached to the forward vertical edge 20 of the quadrant portion 18. The section 35' has a vertical opening 36 therethrough, as best seen in Figure 4, which is for the purpose of receiving the lower end of a vertically extending thermometer 36'. A temperature scale including indicia 36" is disposed at the vertical forward edge 20 of the quadrant section 18 for cooperation with the thermometer 36' to indicate temperature.

The horizontally extending section 35' has a vertical opening 37 therethrough for the purpose of rotatably receiving the rod 10, the opening 37 being disposed forwardly of the thermometer 36.

The horizontally extending section 35' extends further forwardly from the vertical opening 37 and clamp means including a pair of spaced apart spring fingers 38 is attached to the horizontally extending section 35', the spring fingers 38 being adapted to engage a vertically disposed graduated tube 40. The upper end of the tube 40 is open and its bottom is closed and the tube 40 is provided with a graduated scale including indicia indicated at 41 for indicating rain fall, preferably in inches.

The upper end of the quadrant section 18 is supported by an upper horizontally extending section generally indicated at 46 which is attached at its rearward end to its quadrant section 18 and which has a vertically disposed opening 48 therethrough, as best seen in Figure 3, which latter is adapted to receive the upper end of the thermometer 36' therethrough, a vertical aperture 50 disposed forwardly of the opening 48 for receiving the upper end of the rod 11, and the forward end of the horizontal portion 46 comprises an attached tube holder comprising spaced apart horizontally extending fingers 54 which are similar in all respects to the fingers 38 which hold the bottom of the tube.

A suitable retaining nut 56 is provided and is threadedly secured to the upper end of the rod 11 for holding the weather gauge on the rod 11. The thermometer 36' is prevented from falling downwardly through its lower receiving opening 36 by a resilient retainer portion 60 of the body member 17, the resilient retainer portion 60 is preferably of the shape of part of a cylinder with its rearward edge attached to the forward vertical edge of the quadrant portion 18 of the body member 17.

The resilient retainer portion 60 is vertically elongated and its inner surface is disposed inwardly of the inner surface of the aligned thermometer receiving openings 48 and 36, and since the retainer portion 60 is also resilient, this has the effect of maintaining a constant pressure against the thermometer 36' to retain the thermometer in position.

In operation it will be seen that when the rod 11 is vertically mounted as shown the body member 17 is free to rotate about a vertical axis through the rod 11 because wind direction would be indicated by the projection 35 in cooperation with the wind direction scale 16.

The wind velocity will cause the vane 23 to swing about an axis extending through the pivot pin 25' so that the vane 23 can swing freely along the scale 22, for example from the dotted line position shown in Figure 1, which indicates a zero wind velocity to the full line position, shown in Figure 1, which indicates a wind velocity of approximately fourteen miles per hour. The greater the wind velocity the higher will be the upper portion of the vane 23. After the temperature falls the level of liquid in the thermometer 36' will vary and this can be read by means of the scale 36" which is arranged contiguous to the thermometer. Similarly the open top tube 40 will collect rain fall and the quantity thereof can be accurately determined or measured by the graduations 41. After a rain it is desirable that the operator empty the tube 40 and record the rain fall on the scale 31.

It will be seen that in a sense a single weight ball could be used instead of the two weight balls 26. However to preserve balance a single weight ball would need to be in the center and would also need to be of larger size, thus making it necessary to make the vane 24 longer and consequently the rod 11 longer in order to assure that the vane would be spaced above the mounting position 12. For this reason I have discovered that in the use of two balls in the position shown preserves balance and makes the over-all size of the ball smaller to make possible a smaller package for shipping.

It will also be seen that the opening 36 for receiving the lower end of the thermometer could be a well closed at the bottom. However I prefer that this opening 36 be opened at the bottom permitting any water that might enter the opening 36 to drain out to prevent freezing of the water int he winter time as might break the thermometer.

As best seen in Fig. 2 the space between the sides of the substantially U-shaped vane 23 is lesser at a point adjacent the rearward end of the vane so as to form portions 60' inwardly extending which are adapted to engage opposite sides of the quadrant shaped portion 18 so that any contact between the U-shaped vane 23 and the quadrant shaped portion 18 is substantially a point contact rather than a contact over larger areas of U-shaped vane 23 for providing minimum of friction.

It will be seen that the tube 40 is forwardly of the rod 11 and serves as a counter-balance for the body portion of the gauge.

The thermometer 36' is adjustable vertically as is important because the internal diameter of thermometers has to come from the factories varies considerably whereby each has to be calibrated separately and the possibility of vertical alignment of a thermometer opposite a scale as shown makes it best to use uncalibrated thermometers at a much lesser cost.

Thus, it will be seen that there has been provided a weather unit which combines in one device a means for showing current rain fall, accumulative rain fall, temperature, wind direction and wind speed.

An important advantage of the weather gauge of the present invention is that the five above named weather conditions are all ascertainable by means of one small low priced unit, and the instrument may be attached to any convenient post in a locality where rain can fall into the tube 40 and the wind can actuate the vane 23 and at the same time blow against the quadrant portion 18 to show wind direction and against the vane 23 to show wind speed.

If desired, the wind indicator may have camber, and may be curved to get lift similar to an airplane wing.

It will be seen that the legs 24 of the vane are of substantial horizontal width as seen when in horizontal position so as to catch wind to substantially assist the positioning of the vane and to make it possible for the remainder or outer end of the vane to be smaller than would otherwise be necessary whereby a compact shape is attained for better operation and easier boxing and shipping.

It will be seen that in operation the raised bearing portions 26 having vertically disposed outer surfaces receive thereagainst the vertically disposed inner surfaces of the terminal portions 25 of the legs 24 of the vane. This construction is to guide the vane during its swinging movements.

It will be seen that to have the rain indicator tube 40 on an opposite side of the rod 11 from the wind indicator body member 17 causes the tube 40 to tend to counterbalance the body member 17 to a substantial extent as causes lesser binding on the rod 11 and a rotation with lesser frictional resistance.

From the foregoing description, it is thought to be obvious that a weather gauge constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a weather gauge, a vertically disposed stationary rod having its lower end securable to a supporting structure, a body member having a forward side rotatably connected to said rod for horizontal swinging, said body member having a portion having two vertically disposed parallel sides, and an outer edge, said body member having a row of wind velocity scale markings on a side thereof, an approximately U-shaped vane straddling said body portion and said vane including a pair of spaced apart legs and means pivotally mounting the forward ends of said legs on said body member for rotation about a horizontal axis and at a point disposed forwardly of said scale markings, said vane being of such weight that the weight, shape and area of said vane are proportional to said wind speed scale, said vane being spaced from said body portion sufficiently to be freely movable with respect thereto, said vane being weighted by at least one ball formed of material heavier than the material of said vane, said vane having an opening transversely therethrough receiving said ball and means for retaining said ball in said opening, said means for retaining said ball in said opening comprising the projection of circular flanges extending above and below said vane respectively, said flanges being integral with adjacent projections of the vane and extending over sufficient portions of the surfaces of said ball weights for retaining the weights firmly in the said openings in said vane, said flanges having inner surfaces of a shape complemental to the outer surface of said ball.

2. In a weather gauge, a vertically disposed stationary rod having its lower end securable to a supporting member, a substantially quadrant-shaped body member, including a straight vertical side, means pivotally securing said straight vertical side to said rod at at least two points for horizontal swinging movement of said body in accordance with wind direction, said body having a straight horizontal side extending from the top of said vertical side, and an arcuate side connecting the outer end of said horizontal side with the lower end of said vertical side, said arcuate side having indicia thereon designating wind velocity, said horizontal, vertical and arcuate sides comprising relatively narrow strips of light weight material, a relatively wide wind vane of light material having an elongated control slot having an open end therein disposed in a plane perpendicular to the plane of said body, with said body extended into said slot, the open end of said slot being positioned adjacent the juncture of said vertical and horizontal sides whereby the major portion of said vane extends on opposite sides of said body, means pivotally connecting the end of said vane adjacent said open end of said slot to said body member at the juncture of said vertical and horizontal sides at a point forwardly, relative to said rod, of the lowest indication of wind velocity on said arcuate side, and weight means carried by said vane adjacent its free end, the weight, shape and area of said vane being proportional to the wind speed indicated by said indicia.

3. In a weather gauge, a vertically disposed stationary rod having its lower end securable to a supporting member, a substantially quadrant-shaped body member, including a straight vertical side, means comprising spaced apart lugs pivotally securing said straight vertical side to said rod at at least two points for horizontal swinging movement of said body in accordance with wind direction, each of said lugs having a pair of oppositely disposed fingers engaging opposite sides of said straight vertical side, an enlarged apertured central portion surrounding said rod, and oppositely disposed resilient fingers extending from said enlarged central portion in the side of said rod opposite said body, a rainfall catching tube releasably supported by said resilient fingers, said body having a straight horizontal side extending from the top of said vertical side, and an arcuate side connecting the outer end of said horizontal side with the lower end of said vertical side, said arcuate side having indicia thereon designating wind velocity, said horizontal, vertical and arcuate sides comprising relatively narrow strips of light weight material, a relatively wide wind vane of light material having an elongated control slot having an open end therein disposed in a plane perpendicular to the plane of said body, with said body extended into said slot, the open end of said slot being positioned adjacent the juncture of said vertical and horizontal sides whereby the major portion of said vane extends on opposite sides of said body, means pivotally connecting the end of said vane adjacent said open end of said slot to said body member at the juncture of said vertical and horizontal sides at a point forwardly, relative to said rod, of the lowest indication of wind velocity on said arcuate side, and weight means carried by said vane adjacent its free end, the weight, shape and area of said vane being proportional to the wind speed indicated by said indicia.

4. In a weather gauge, a vertically disposed stationary rod having its lower end securable to a supporting member, a substantially quadrant-shaped body member, including a straight vertical side, means pivotally securing said straight vertical side to said rod at at least two points for horizontal swinging movement of said body in accordance with wind direction, said body having a straight horizontal side extending from the top of said vertical side, and an arcuate side connecting the outer end of said horizontal side with the lower end of said vertical side, said arcuate side having indicia thereon designating wind velocity, said horizontal, vertical and arcuate sides comprising relatively narrow strips of light weight material, a relatively wide wind vane of light material having an elongated control slot having an open end therein disposed in a plane perpendicular to the plane of said body, with said body extended into said slot, the open end of said slot being positioned adjacent the juncture of said vertical and horizontal sides whereby the major portion of said vane extends on opposite sides of said body, means pivotally connecting the end of said vane adjacent said open end of said slot to said body member at the juncture of said vertical and horizontal sides at a point forwardly, relative to said rod, of the lowest indication of wind velocity on said arcuate side, weight means carried by said vane adjacent its free end, the weight, shape and area of said vane being proportional to the wind speed indicated by said indicia, and oppositely disposed projecting guide points on opposite sides of said slot adjacent opposite sides of the arcuate side of said body for centering and aligning said vane, said slot being of a width sufficient to permit free swinging pivotal movement of said vane.

5. In a weather gauge, a vertically disposed stationary rod having its lower end securable to a supporting member, a substantially quadrant-shaped body member, including a straight vertical side, means comprising spaced apart lugs pivotally securing said straight vertical side to said rod at at least two points for horizontal swinging movement of said body in accordance with wind direction, each of said lugs having a pair of oppositely disposed fingers engaging opposite sides of said straight vertical side, an enlarged apertured central portion surrounding said rod, and oppositely disposed resilient fingers extending from said enlarged central portion in the side of said rod opposite said body, a rainfall catching tube releasably supported by said resilient fingers, said body having a straight horizontal side extending from the top of said vertical side, and an arcuate side connecting the outer end of said horizontal side with the lower end of said vertical side, said arcuate side having indicia thereon designating wind velocity, said horizontal, vertical and arcuate sides comprising relatively narrow strips of light weight material, a relatively wide wind vane of light material having an elongated control slot having an open end therein disposed in a plane perpendicular to the plane of said body, with said body extended into said slot, the open end of said slot being positioned adjacent the juncture of said vertical and horizontal sides whereby the major portion of said vane extends on opposite sides of said body, means comprising a pair of arms connected to the end of said vane on opposite sides of the open end of said slot and in a plane perpendicular to the plane of said vane, bearings between the inner faces of said arms and said body and a pivot pin extending through said arms and bearings pivotally connecting the end of said vane adjacent said open end of said slot to said body member at the juncture of said vertical and horizontal sides at a point forwardly, relative to said rod, of the lowest indication of wind velocity on said arcuate side, weight means carried by said vane adjacent its free end, the weight, shape and area of said vane being proportional to the wind speed indicated by said indicia, and oppositely disposed projecting guide points on opposite sides of said slot adjacent opposite sides of the arcuate side of said body for centering and aligning said vane, said slot being of a width sufficient to permit free swinging pivotal movement of said vane.

6. A weather gauge including a wind indicator, said wind indicator comprising wind velocity and direction indication means, said wind direction indication means comprising a wind-receiving vertical member having surfaces on opposite sides thereof, said wind-receiving surfaces being of substantial size and being in substantial parallelism and closely spaced apart a short distance with respect to each other relative to the distances of the other dimensions of said surfaces for achieving a thinness so as to cause said wind indicator to function as a wind-vane for assuming a position in approximate parallelism with the direction of wind striking said wind surfaces, said weather gauge also including a rain-fall collecting and indicating means disposed horizontally spaced from said wind indicator, means interconnecting said wind indicator and said rain-fall collecting means and provided with vertically extending elongated opening means therethrough, a vertical rod, said rod passing through said elongated opening means to pivotally support said weather gauge for horizontal rotation about said rod whereby said rainfall collecting means tends to counterbalance said wind indicator to a substantial extent as causes lesser binding on the said rod and makes possible rotation of said rainfall collecting means and said wind indicator about said rod with lesser frictional resistance.

References Cited in the file of this patent
UNITED STATES PATENTS

| | | |
|---|---|---|
| 631,161 | Froehlich et al. | Aug. 15, 1899 |
| 1,118,259 | Beard | Nov. 24, 1914 |
| 1,377,578 | Harris | May 10, 1921 |
| 1,407,068 | Johnson | Feb. 21, 1922 |
| 1,708,036 | Stenbol | Apr. 9, 1929 |
| 2,749,751 | Hastings | June 12, 1956 |
| 2,845,797 | Hiscock | Aug. 5, 1958 |